United States Patent [19]

Glaser

[11] Patent Number: 4,630,959
[45] Date of Patent: Dec. 23, 1986

[54] CONNECTION OF TWO SPACER FRAME PROFILES AS WELL AS PROCESS AND APPARATUS FOR THE ESTABLISHMENT OF THE CONNECTION

[75] Inventor: Siegfried Glaser, Beverungen, Fed. Rep. of Germany

[73] Assignee: Helmut Lingemann GmbH & Co., Fed. Rep. of Germany

[21] Appl. No.: 526,591

[22] Filed: Aug. 26, 1983

[30] Foreign Application Priority Data

Sep. 9, 1982 [DE] Fed. Rep. of Germany ....... 3233399

[51] Int. Cl.⁴ .................... F16B 12/04; B29C 31/06
[52] U.S. Cl. .................... 403/266; 403/292; 264/263
[58] Field of Search ........... 403/265, 266, 267, 292, 403/5, 295, 268, 269, 205; 156/145, 293; 285/294, 297; 29/416, 460; 49/479; 264/263, 267

[56] References Cited

U.S. PATENT DOCUMENTS

| | | | |
|---|---|---|---|
| 2,392,734 | 1/1946 | Haberstump | 403/265 |
| 2,464,514 | 3/1949 | Kaufmann | 403/295 |
| 3,030,951 | 4/1962 | Mandarino | 264/263 |
| 3,159,886 | 12/1964 | Lynch | 49/479 |
| 3,293,106 | 12/1966 | Cocco et al. | 264/263 |
| 3,380,145 | 4/1968 | Stroud et al. | 29/411 |
| 3,492,381 | 1/1970 | Rhyne | 264/36 |
| 3,554,590 | 4/1971 | Tarantino | 403/293 |
| 3,731,710 | 5/1973 | Bauer et al. | 285/294 |
| 3,847,694 | 11/1974 | Stewing | 285/297 |
| 3,874,060 | 4/1975 | Barnes | 29/416 |
| 3,893,777 | 7/1975 | Jones | 264/263 |
| 3,900,541 | 8/1975 | Klapwijk | 264/263 |
| 4,376,748 | 3/1983 | Van Erven | 264/261 |

*Primary Examiner*—Cornelius J. Husar
*Assistant Examiner*—Peter M. Cuomo
*Attorney, Agent, or Firm*—Goodman & Teitelbaum

[57] ABSTRACT

Connection of two spacer frame hollow profiles which are usable for the production of an insulating glazing and, possibly, are filled with a drying agent. The abutting edges of two hollow profile pieces are set against one another and a one-piece connecting body is seated in a hollow space defining a cavity on both sides of the abutting edges, the connecting body bridging across the abutting edges in a form-locking manner. The connecting body is a hardened fusion adhesive plug which is injected as a liquid through a wall of at least one of the profile pieces into the cavity.

14 Claims, 6 Drawing Figures

CONNECTION OF TWO SPACER FRAME PROFILES AS WELL AS PROCESS AND APPARATUS FOR THE ESTABLISHMENT OF THE CONNECTION

The invention relates to a connection of two spacer frame profiles which are used for the production of insulating glazings. It relates, further to a process and to a device for the establishment of the connection.

Spacer frame profiles are put together piece-wise into rectangular frames, in which process, as a rule, a drying agent is filled into the hollow space of the profiles. Corner connectors are used for the putting together of the frame. Recently, processes and devices have been developed by which the frame corners can be bent so that a frame, for example, can be produced from a single profile bar or from only two profile bars (German published application AS No. 29 07 838; European patent application No. 0003715; German utility model GM No. 78 25 704). The edges, which are abutting against one another, lie in the straight frame parts, so that the corner connectors are eliminated.

The connection of the abutting edges can be accomplished by means of collars which are slipped, in a form-locking arrangement, over the abutting edge zones (German published application AS No. 29 07 838). The collars form frame-outside edges which are troublesome in the further processing of the frame for insulating glazing. Furthermore, for profiles differing in cross section, there must be used correspondingly different collars. This involves keeping an increased stock of different collars. Most known devices for the bending of a frame can, moreover, process different cross sections of the profile bars, and are fitted with automatically driven, expensive feed arrangements for the connecting elements. The feed arrangements, however, are always arranged only for the processing of a certain connector type, and have to be changed if, on the same device, profiles of other cross section are to be worked.

Another type of connection provides a straight connecting arrangement, which is glued in a form-locking arrangement with one insert end inserted into each of the abutting frame parts, the insert ends presenting tolerance compensating tongues and/or tolerance compensating curvatures, as well as adhesive troughs in the zone between the insert ends (German utility model GM No. 78 25 704). For this type of connection, it holds that the connecting piece forms, to be sure, no outside edges, but has, on the other hand, a complicated spatial form. Further, it holds, in respect to the working of different spacer frame profiles with one and the same machine, that also in this case, there have to be available correspondingly different spatial forms of the connecting pieces and different feed arrangements. What type of adhesive to be used, for the cementing of the known connecting pieces with the respective spacer frame profile, is not indicated.

Finally, from U.S. Pat. No. 3,380,145, there is also known the practice of closing mitering openings in a spacer frame profile with a rubber plug, the cross section of which is adapted to the cross section form of the spacer frame profile. The rubber plug is to prevent the trickling out of the drying agent.

An object of the present invention is to provide a connection between the abutting edges of two spacer frame profiles, preferably filled with drying agent, which is producible rapidly and simply, independently of the profile.

Another object of the present invention is, further, to develop a process and an apparatus for the production of the above connection.

With the above and additional objects and advantages in view, as will hereinafter appear, this invention comprises the devices, combinations and arrangements of parts hereinafter described by way of example and illustrated in the accompanying drawings of a preferred embodiment in which.

Figure 4:
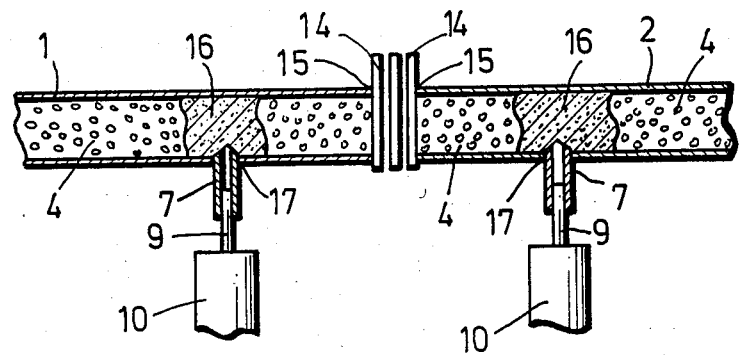
Figure 5:
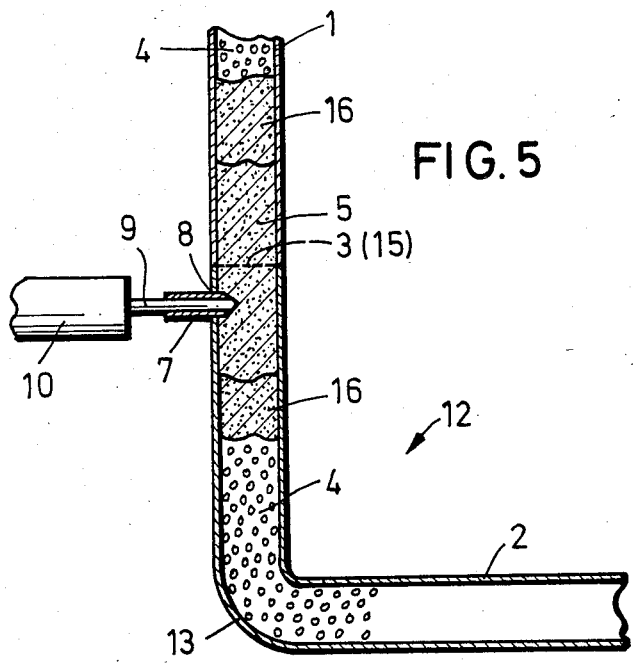
Figure 6:
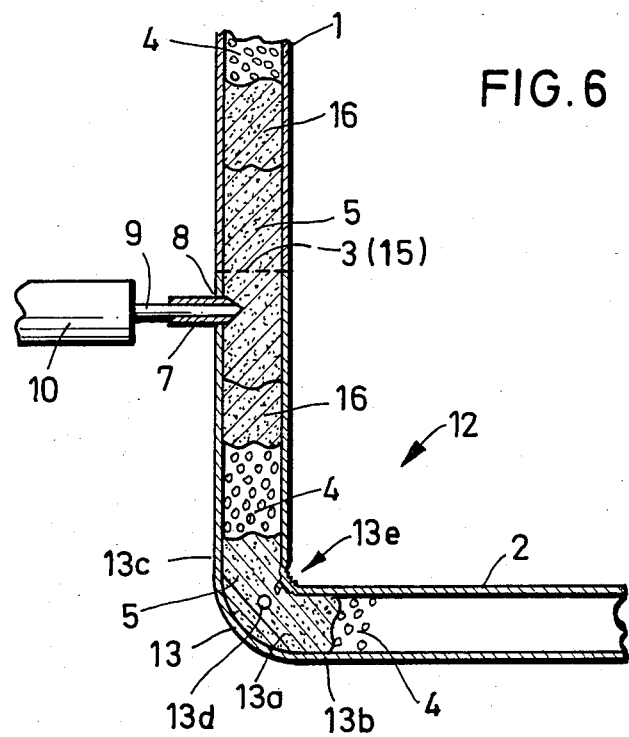

FIGS. 4 and 5 schematically show the process for the production of the connection, according to the present invention, in the straight shank of a spacer frame; and FIG. 6 shows the present invention in the zone of a frame corner.

According to the present invention, two bar-form spacer frame profile pieces 1 and 2 have abutting edges 3. The edges 3 are set straight, or in another similar manner in a form-locking arrangement one against another, so that the pieces 1 and 2 are joined with one another. In such arrangement, these hollow profiles—as known per se—can be filled with a drying agent 4. The spacer frame profile bars are supplied by the manufacturer in unit lengths of several meters, and are assembled by the insulating glass manufacturer into a frame. It occurs therefore, that there are present overlengths and/or too-short bars. Overlengths of the bars were hitherto mostly sawed off and thrown away. The adding of the part pieces, in the case of the underlengths, requires a high expenditure in labor or apparatus. This invention provides, especially in this context, a remedy for all cases in which it is to the point and necessary to join bar pieces with one another, or to couple together frame parts which are bent from rod pieces.

Accordingly, the present invention provides that the hollow space, extending across the abutting edges 3 within the two spacer frame profile pieces 1 and 2, is filled with a one-piece plug 5 of a hardened fusion adhesive. In this arrangement, the fusion adhesive plug 5 adheres adhesively to the inner wall of the two hollow profiles. By reason of its cohesive strength, such a joining of the profile pieces 1 and 2 assures that at least the handling thereof for the production of a spacer frame can be carried out without the connection being impaired.

In the case where the drying agent 4 is present in the hollow profiles 1 and 2, it can appropriately be provided that each hollow profile is plugged with a plug 6 of a plastic or an elastic material, so that the drying agent 4 will not trickle out during the handling of the profile pieces 1 and 2, in which case the plug 6 should be arranged about 20 mm behind the respective abutting edge 3.

Figure 1:
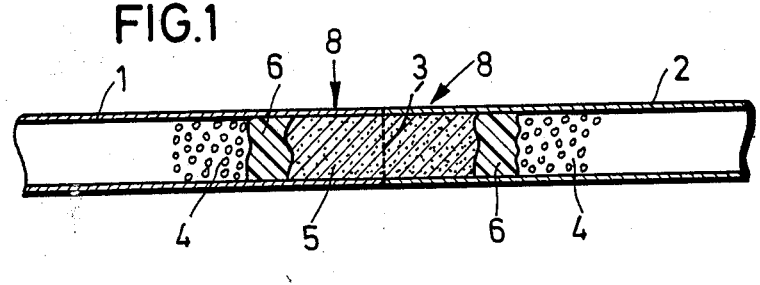
FIG. 1 shows a longitudinal section through the connecting place of two spacer frame profiles.
Figure 2:
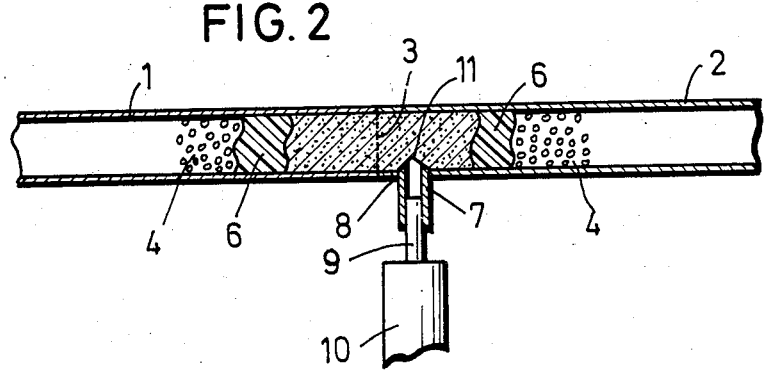
FIG. 2 shows a longitudinal section through the connecting place of two spacer frame profiles, and the device for injecting the adhesive.
Figure 3:
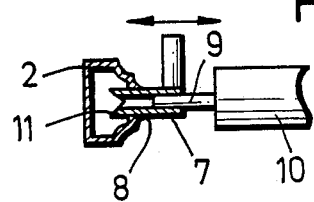
FIG. 3 shows a cross section through the injection place, and the device for injecting the adhesive.

The connection, according to the present invention shown in FIGS. 1-3, is established with the aid of an injection cannula 7. At least one hole 8 is made into a wall of a hollow profile bar 1, 2 for receiving the injection cannula 7. The cannula 7 is mounted onto a nozzle 9 which communicates with a fusion adhesive transport device 10, the device 10 being capable of pressing liquid fusion adhesive through the nozzle 9, which adhesive in turn passes through the cannula 7. The injection cannula 7, which expediently projects somewhat forward, is fabricated from a material which is very much harder than the material of the profile bars 1 and 2. For example, a cannula 7 can be stainless steel if the profile bars 1 and 2 are made from aluminum or similar light metal. Preferably, the cannula 7 includes at least one knife-sharp point 11, which facilitates the penetration thereof through the wall of a profile bar.

Devices 10 for the spraying of fusion adhesives are well known and do not need to be described in detail. These devices, however, have not been usable for the problem being solved according to the present invention, because no expedient arrangement was known by which a sufficiently large hole, for the injection of the liquid fusion adhesive, could be made in the wall of a hollow profile bar at any desired place with the nozzle systems known per se. With a surprising simple means, namely the combination of an injection nozzle known per se with an injection cannula, the present invention solves this problem.

For the joint formation, the hollow profile pieces 1 and 2, having the plugs 6 installed therein before the joint formation, are set against one another with the edges 3 abutting each other. Thereupon, the injection cannula 7 is driven against a wall of a profile bar and pierces the wall, thus forming the hole 8. Liquid fusion adhesive in the device 10 is then pressed through the nozzle 9 and cannula 7 into the cavity until the cavity between the plugs 6 expediently is completely filled. The cannula 7 is then moved out of the hole 8. The fusion adhesive hardens and, through its adhesive and cohesive forces, assures the desired connection.

It is also possible to inject fusion adhesive simultaneously or successively both into the profile 1 and also into the profile 2. The choice of procedure is governed according to the amount of adhesive required and the time that is available for the hardening of the adhesive and the injection. It can also be expedient to punch a hole 8 in each of the profile bars 1 and 2, and to only inject the fusion adhesive through the hole 8 of the profile bar 2. When the fusion adhesive in the process passes through the bars 1 and 2 and then swells up out the other hole 8 of the bar 1, this can be an aid to recognizing that sufficient fusion adhesive has been injected.

As the fusion adhesive, there is preferably used a one-component adhesive, for example, an ethylene vinyl acetate adhesive with a Shore hardness of 60° to 80° in the hardened state. The adhesive is expediently injected at a viscosity of about 2000 mPs at 160° C. and should have a setting time of about two seconds, after which it is sufficiently hardened to ensure the desired connection.

According to a special form of execution of the present invention, there is used as the function adhesive, an adhesive on the basis of a copolyamide, there being preferably selected a working range from 180° to 240° C.

It is expedient that, for example, in the case of a spacer profile bar with a maximum wall spacing of about 10 mm, that a cavity of about 20 mm in depth be filled with the fusion adhesive in each case adjacent the abutting edge.

In the production of a frame 12 with curved corners 13, the present invention can be used with special advantages, as shown in FIGS. 4 and 5. If the bar length is not set off for the desired frame size, which as a rule is usually the case, the extra lengths of the pieces have to be sawed off from the profile bars 1 and 2 which are filled with drying agent 4, by using a saw 14. According to the present invention, before the sawing, the wall of the bars 1 and 2, about 20 mm in front of the section place 15, is pierced with the injection cannula 7. The fusion adhesive is injected through the hole 17, formed by the cannula 7, into the profile which is filled with drying agent 4. Accordingly, the loosely filled-in drying agent 4 is displaced in each case laterally from the place of injection, so that a plug 16 is formed. However, a plug can also be formed which contains at least a partly drying agent, such as granulate in the manner of a mortar, if no complete displacement of the drying agent is possible.

Afterwards, the severing cut with the saw 14 is then made as shown in FIG. 4, after which the drying agent 4, which is present in the cavity between the section place 15 and the plug 16, trickles out. However, the drying agent 4 behind the plug 16—as intended—is closed off, and, namely, air-tight, so that atmospheric moisture cannot force its way from the section place 15 through the plug 16, to the drying agent which is behind the plug 16.

The two bars 1 and 2 thus prepared are set against one another with their edges 3 (15) abutting for the frame formation. The cannula 7 is then driven against a wall of the hollow space between the two plugs 16 and penetrates the wall to form the hole 8, as shown in FIG. 5. Thereupon, the fusion adhesive is injected, so that the one-piece connecting plug 5 is formed within the two bars across the abutting edges 3. When the cannula is drawn out of the hole 8, and the fusion adhesive has hardened after a short time, there is established the connection of the two spacer frame hollow profiles 1 and 2 according to the present invention, and, namely, being made rapidly and with relatively simple means, as well as with a low expenditure in apparatus.

The connection according to the present invention ensures, preferably, not only the cohesion of the frame pieces attached to one another, but also an air-tight sealing at the abutting places, both going into the interior of the profile tubes and also going out from the interior of the insulating glazing to the outside.

Thus, the process described is suited, with its fundamental process steps, not only for the establishment of a connection between the abutting edges of two spacer frame profiles, but also for the sealing and, in particular, also the stiffening of a curved corner.

Accordingly, an object of the present invention is also to provide a curved corner and a process for the production of the corner, in which for the execution of the process, the specified device of the present invention is likewise suited.

The curved corner 13 of the present invention as shown in FIG. 5 is produced, for example, according to a known process (German published application AS No. 29 07 838, European unexamined patent specification No. 0 003 715, German utility model No. 78 25 704, U.S. Pat. No. 3,380,145). Inasmuch as before the bending, there is provided a weak zone in the bending area for the facilitation of the bending process, for example, by millings or incisions or unlatchings or the like, the curved corner as a rule presents a zone which has a relatively low rigidity.

A high rigidity of the frame, however, is desirable for its handling, for example, in the further processing for the insulating glazing. The present invention provides, accordingly, injecting a plug into the corner zones. The plug reinforces the corner and seals, if need be, places still open to the interior space of the glazing, which arise from the weakenings or millings, incisions, unlatchings or the like to the interior of the profile bars and to the interior of the glazing.

In FIG. 6, for example, there is shown a curved corner 13, the hollow space of which is filled with a plug 13a, which occupies both the corner space proper and also parts of the shanks 13b, 13c of the profile bars. The length of the plug 13a is governed according to the desired stiffening. Likewise, the injected material used is governed according to the desired stiffening. Accordingly, the adhesive used forms a relatively solid, rigid body after the hardening thereof.

The injection can be made between the outer side walls through the hole 13d, or from the outside through the one outer wall at the corner zone. In the process, preferably, the above drying agent 4—as already described in context with the joining of two abutting pieces—is to be expelled. In particular, the dust particles of the drying agent 4, that have arisen by the squeezing thereof during the bending of a profile bar filled with the drying agents, are to be expelled and/or bound by the adhesive. Accordingly, these dust components or other drying agent particles can trickle through openings 13e present in the corner zone, possible after the bending thereof, and pass into the interior of the glazing and would be able to settle there on the surface of the panes, which was the case hitherto. The present invention, therefore, solves this problem, for which, despite the long known considerable need, there was not yet any usable course of solution, in an astonishingly simple manner.

The injecting of the plug into the corner zones can be carried out before or after the bending. According to a special form of execution of the present invention, however, the injection does not take place until after the bending. In the latter case, the pressure with which the fusion adhesive is pressed into the cavity is preferably chosen in such a way, that the injected fusion adhesive can be used to push out bights or bruises that have arisen in the walls and extend into the interior of the hollow profile through the bending of the corner.

Numerous alterations of the structure herein disclosed will suggest themselves to those skilled in the art. However, it is to be understood that the present disclosure relates to preferred embodiments of the invention which are for purposes of illustration only and are not to be construed as a limitation of the invention.

What is claimed is:

1. Connection of two spacer frame hollow profile pieces that are usable for production of an insulating glazing, comprising:
   each of said two hollow profile pieces having spaced apart top and bottom walls and spaced apart side walls to provide an interior space within each of said profile pieces, a first portion of said interior space within each of said profile pieces being filled with a drying agent to define a second portion of said interior space within each of said profile pieces adjacent to outer edges of each of said profile pieces;
   first and second plugs being disposed in respective ones of said two hollow profile pieces within an inner section of said second portion of said interior space against said drying agent to retain said drying agent within said first portion of each of said profile pieces;
   said outer edges of said profile pieces being set against one another in an abutting arrangement so that said second portions of said interior spaces are in communication with each other to provide a cavity extending on both sides of said abutting arrangement from said first plug to said second plug;
   said cavity being closed off on opposite sides thereof by said first and second plugs respectively;
   connecting means being injectable through at least one of said walls of said profile pieces for connecting said profile pieces together;
   said connecting means including a one-piece connecting body being seated within said cavity within said profile pieces, said connecting body bridging across said abutting arrangement and being disposed against said first and second plugs for positioning on both sides of said abutting edges;
   said connecting body including adhesive means to adhere adhesively to inner wall surfaces of said top, bottom and side walls of each of said profile and to facing walls of said first and second plugs;
   said adhesive means including a hardened fusion adhesive third plug; and
   means for injecting said third plug as a liquid through said one of said walls of said profile pieces into said cavity.

2. Connection according to claim 1, wherein said means for injecting said third plug includes at least one injection hole in said one of said walls of said profile pieces next to one of said abutting edges.

3. Connection according to claim 1, wherein said first and second plugs are fabricated from an elastic or plastic material.

4. Connection according to claim 1, wherein said first and second plugs are fabricated from additional fusion adhesive containing a drying agent, and second means for injecting said additional adhesive into said cavity.

5. Connection according to claim 4, wherein said second means includes an injection hole in one of said third walls of each of said profile pieces in a zone of said first and second plugs respectively.

6. Connection according to claim 2, wherein said means for injecting said plug further includes a cannula for piercing said injection hole in said one of said walls of said profile pieces, and a nozzle of a fusion adhesive transport device inserted axially into said cannula.

7. Connection according to claim 1, wherein said third plug consists of an ethylene vinyl acetate adhesive.

8. Connection according to claim 7, wherein said third plug presents a Shore hardness of 60° to 80°.

9. Connection according to claim 1, wherein said third plug consists of a hardened copolyamide.

10. Process for connecting two spacer frame hollow profile pieces each having spaced apart top and bottom walls and spaced apart side walls to provide an interior space within each of the profile pieces adjacent to outer edges of the profile pieces, comprising:
    filling each profile piece with a drying agent;
    injecting a first fusion adhesive through a cannula into the interior space of each profile piece so that first and second plugs are formed respectively in each profile piece to retain the drying agent with each profile piece;
    setting the outer edges of the profile pieces against one another in an abutting arrangement so that the interior spaces of the profile pieces are in communication with each other to provide a cavity extending on both sides of the abutting arrangement from the first plug to the second plug, the cavity being closed off on opposite sides thereof by the first and second plugs respectively;

extending the cannula through at least one of the walls of the profile pieces into the cavity;

injecting a second fusion adhesive through the cannula into the cavity so that the second fusion ahesive bridges across the abutting arrangement and is disposed against the first and second plugs for positioning on both sides of the abutting edges; and allowing said second fusion adhesive to harden into a third plug which adheres adhesively to inner wall surfaces of the top, bottom and side walls of each of the profile pieces and to facing walls of the first and second plugs for connecting the profile pieces together.

11. Process according to claim 10, including the step of piercing said one of the walls of the profile pieces with the cannula for extending the cannula through said one of the walls of the profile pieces.

12. Process according to claim 10, including the following initial steps performed before the step of setting the outer edges of the profile pieces against one another;

sawing off an end from each profile piece to form the outer edges so that the first and second plugs are spaced from the outer edges respectively; and removing the drying agent from space between each of the first and second plugs and its associated outer edge.

13. Process according to claim 10, wherein the step of injecting the second fusion adhesive includes injecting an ethylene vinyl acetate adhesive with a viscosity of about 2000 mPs at 160° C. and a setting time of about 2 seconds.

14. Process according to claim 10, wherein the step of injecting the second adhesive includes injecting a co-polyamide adhesive in a working range of 180° to 240° C.

* * * * *